United States Patent
Rogers, Jr. et al.

(10) Patent No.: US 6,748,816 B2
(45) Date of Patent: Jun. 15, 2004

(54) SELF-BACKDRIVING JACKSCREW APPARATUS

(75) Inventors: Lloyd Walker Rogers, Jr., Shelby Township, MI (US); Jeff S. Hamminga, Warren, MI (US); Joseph Michael Johnson, Huntington Woods, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/098,959

(22) Filed: Mar. 15, 2002

(65) Prior Publication Data

US 2003/0015047 A1 Jan. 23, 2003

Related U.S. Application Data

(60) Provisional application No. 60/307,292, filed on Jul. 23, 2001.

(51) Int. Cl.$^7$ ................................................ F16H 25/20
(52) U.S. Cl. .................................... 74/89.25; 185/40 R
(58) Field of Search ............................ 74/89.23, 89.25, 74/89.33, 89.37; 185/37, 40 R, 40 B

(56) References Cited

U.S. PATENT DOCUMENTS

| | | | | | |
|---|---|---|---|---|---|
| 4,266,437 | A | * | 5/1981 | Obergfell | 74/89.37 |
| 4,723,454 | A | * | 2/1988 | Periou et al. | 74/89.25 |
| 4,932,277 | A | * | 6/1990 | Beaux | 74/89.25 |
| 5,180,038 | A | * | 1/1993 | Arnold et al. | 188/171 |
| 5,983,739 | A | * | 11/1999 | Feder | 74/89.25 |
| 6,308,587 | B1 | * | 10/2001 | Shinkawa et al. | 74/89.25 |
| 6,435,575 | B1 | | 8/2002 | Pajak et al. | |
| 6,517,128 | B2 | | 2/2003 | Perkins et al. | |
| 6,550,867 | B2 | | 4/2003 | Rogers, Jr. et al. | |

* cited by examiner

Primary Examiner—David A. Bucci
Assistant Examiner—Timothy McAnulty
(74) Attorney, Agent, or Firm—Scott A. McBain

(57) ABSTRACT

A self-backdriving jackscrew apparatus including a biasing member connected to a screw portion of a jackscrew that exerts backdriving force on the screw to turn the screw in a rotational direction that returns a nut portion of the jackscrew to a home position on the screw.

16 Claims, 2 Drawing Sheets

SELF-BACKDRIVING JACKSCREW APPARATUS

RELATED APPLICATION

This patent application claims benefit of U.S. Provisional patent application No. 60/307,292 filed Jul. 23, 2001 now abandoned.

FIELD OF THE INVENTION

This invention relates generally to a jackscrew apparatus for actuating a mechanism operably connected to a nut portion of the jackscrew.

BACKGROUND OF THE INVENTION

Jackscrews are commonly used to actuate mechanisms such as vehicle door latch components and to move other members that, to be moved efficiently, require the mechanical advantage provided by such a system. A typical jackscrew includes a nut that is supported for reciprocal translational motion and against rotational motion. A screw threadedly and drivingly engages the nut to drive the nut in a driven direction along the screw. The nut may be backdriven, i.e., returned to a home position on the screw, by reversing screw rotation.

It's known for jackscrews to include self-backdriving features that either backdrive or assist in backdriving or moving a jackscrew nut opposite the driven direction to a home position. To accomplish this, it's known for a self-backdriving jackscrew system to include a spring that's connected between the jackscrew nut and a stationary structure spaced from the nut in the driven direction. In this position, the spring bears on the nut, resisting nut motion in the driven direction. As the nut moves closer to a distal end of the screw in the driven direction, the spring builds up backdriving force. When driving force is removed from the screw, the pent-up backdriving force of the spring pushes axially on the screw, either causing the nut to return to its home position or aiding a reversible drive motor in returning the nut to its home position.

To function properly, self-backdriving jackscrew systems of this type must have jackscrew nut threads and screw threads of a relatively high pitch, a relatively stiff backdriving spring, and/or a suitable lubricant between the threads of the nut and screw. On their own, or in combination, incorporation of highly pitched threads and a relatively stiff backdriving spring necessitate the selection of a more powerful drive motor than would otherwise be required to operate the jackscrew for a given amount of resistance provided by the member intended to be moved by the jackscrew.

It would be desirable, therefore, to provide a jackscrew apparatus comprising a backdriving system that provides less resistance to the movement of a jackscrew nut in the driving direction. It would also be desirable for such an apparatus to include a backdriving system that backdrives its jackscrew nut more efficiently and with fewer frictional losses.

BRIEF SUMMARY OF THE INVENTION

The invention is a self-backdriving jackscrew apparatus for returning or reducing resistance to the return of a jackscrew nut to a home position on a jackscrew shaft. The apparatus includes a nut supported for reciprocal translational motion and against rotational motion and having internal helical threads. The apparatus also includes a screw having external helical threads that complement and threadedly engage those of the nut. The screw is supported for rotation about a longitudinal screw axis to drive the nut in a driven direction along the longitudinal screw axis when the screw is rotated in one direction about the screw axis and to backdrive the nut opposite the driven direction when the screw is rotated about the screw axis in a second rotational direction opposite the first rotational direction. A biasing member is connected to the screw and is configured to exert backdriving force on the screw that turns the screw in the second rotational direction about the screw axis.

Therefore, because the biasing member applies backdriving force to the screw rather than axially-directed force to the nut, the biasing member is able to backdrive or assist in backdriving the nut more efficiently and with fewer frictional losses.

The invention also includes a method for returning or reducing resistance to the return of a jackscrew nut to a home position on a jackscrew shaft. According to this method a nut having internal helical threads is supported for reciprocal translational motion and against rotational motion on a screw having external helical threads complementing and threadedly engaging those of the nut. The nut is supported on the screw for rotation in a first rotational direction about a longitudinal screw axis to drive the nut in a driven direction along the longitudinal screw axis when the screw is rotated in one direction about the screw axis and to backdrive the nut opposite the driven direction when the screw is rotated about the screw axis in a second rotational direction opposite the first rotational direction. A biasing member is connected to the screw and is configured to provide backdriving force to rotate the screw in the second rotational direction. The nut is then moved along the screw in the driven direction against the backdriving force of the biasing member by rotating the screw in a first rotational direction. The nut is then released and the backdriving force of the biasing member is allowed to move the nut along the screw opposite the driven direction by causing the nut to rotate in the second rotational direction.

BRIEF DESCRIPTION OF THE SEVERAL VIEWS OF THE DRAWINGS

These and other features and advantages of the invention will become apparent to those skilled in the art in connection with the following detailed description and drawings, in which.

DETAILED DESCRIPTION OF INVENTION EMBODIMENT(S)

Figure 1:
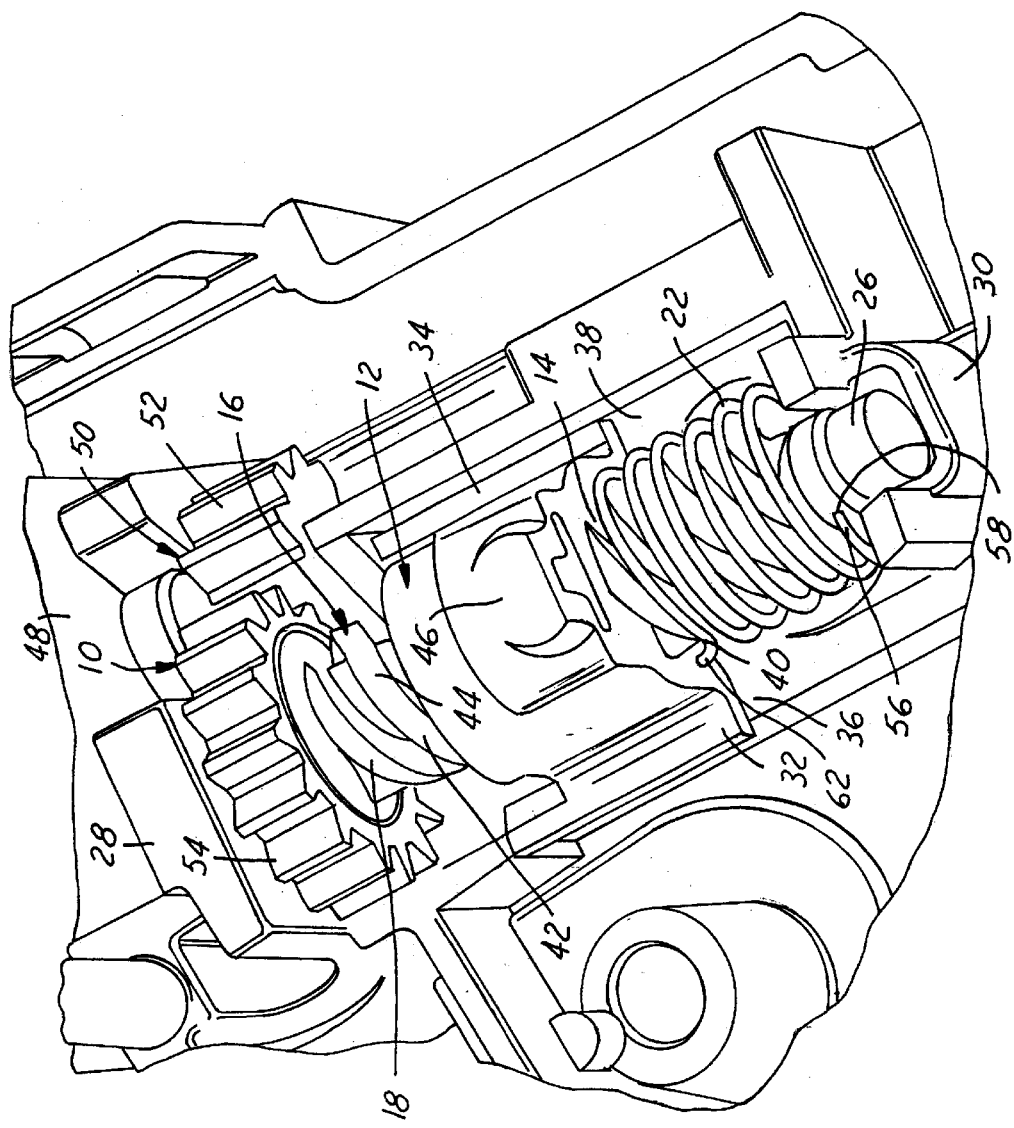
FIG. 1 is a perspective front view of a self-backdriven jackscrew apparatus constructed according to the invention and shown in a door latch mechanism in a vehicle door.
Figure 2:
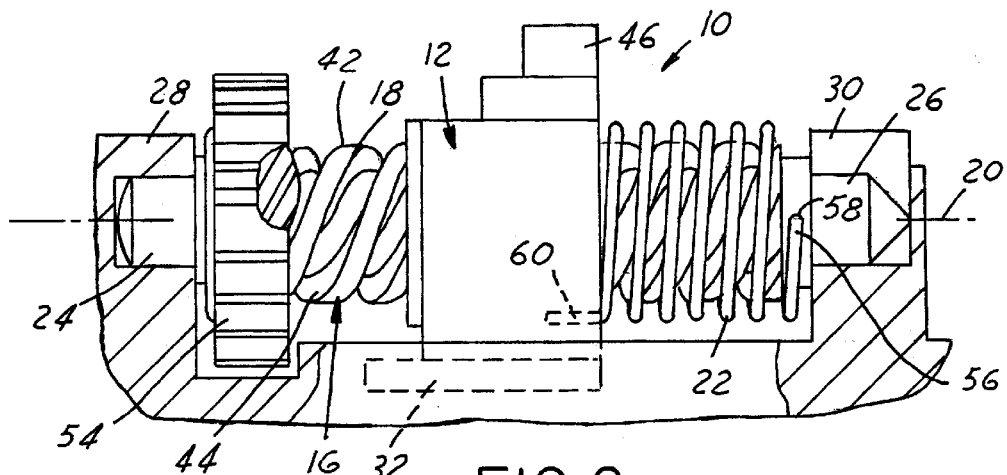
FIG. 2 is a bottom view of the self-backdriven jackscrew apparatus of FIG. 1.

A first embodiment of a self-backdriving jackscrew apparatus for returning or reducing resistance to the return of a jackscrew nut to a home position on a jackscrew shaft is generally shown at 10 in FIGS. 1 and 2. A second embodiment of such a self-backdriving jackscrew apparatus is shown at 10' in FIGS. 3 and 4. Reference numerals with the designation prime (') in FIGS. 3 and 4 indicate alternative configurations of elements that also appear in the first embodiment. Unless indicated otherwise, where a portion of the following description uses a reference numeral to refer to the figures, that portion of the description applies equally to elements designated by primed and double-primed numerals in FIGS. 3 and 4.

Most broadly described, a self-backdriving jackscrew apparatus 10, 10' constructed according to any embodiment of the invention includes a nut 12, 12' that has internal helical threads 14, 14' and is supported for reciprocal translational motion and against rotational motion. The apparatus 10, 10' also includes a screw 16, 16' having external helical threads 18, 18' complementing and threadedly engaging those of the nut 12, 12'. The screw 16, 16' is supported for rotation in a first rotational direction about a longitudinal screw axis 20, 20' to drive the nut 12, 12' in a driven direction along the longitudinal screw axis 20, 20' when the screw 16, 16' is rotated in one direction about the screw axis 20, 20' and to backdrive the nut 12, 12' opposite the driven direction when the screw 16, 16' is rotated about the screw axis 20, 20' in a second rotational direction opposite the first rotational direction.

A biasing member 22, 22' is connected to the screw 16, 16' and exerts backdriving force on the screw 16, 16' that turns the screw 16, 16' in the second rotational direction about the screw axis 20, 20'. The biasing member 22, 22' exerts a backdriving force that includes a force vector component spaced from and directed perpendicular to the screw axis 20, 20' in the second rotational direction. In other words, to further promote screw rotation and nut translation, the biasing member 22, 22' directs at least a portion of the backdriving force tangentially to a circular path of a point on the screw 16, 16' that the biasing member 22, 22' is connected to and applies the backdriving force to.

Describing now, in greater detail, the first embodiment of the apparatus 10 shown in FIGS. 1 and 2, first and second opposite ends 24, 26 of the screw 16 are journalled for rotation in respective first and second bearing assemblies 28, 30. The nut 12 includes a pair of elongated tabs or feet 32, 34 that are slidably received in respective slot receptacles 36, 38 to guide the axially-directed translational reciprocal motion of the nut 12. The internal helical threads 14 of the nut 12 are formed in a cylindrical through-hole 40 extending through the nut 12 and the external helical threads 18 of the screw 16 are formed into an outer circumferential surface 42 of a cylindrical shaft portion 44 of the screw 16. The nut 12 also includes a radially outwardly extending peg 46 constructed and positioned to engage whatever mechanism the apparatus 10 is intended to operate.

An electric motor 48 is supported adjacent the jackscrew apparatus 10 and is drivingly coupled, i.e., is connected directly or indirectly, to the screw 16. The motor 48 is designed and positioned to rotate the screw 16 in the first direction about the longitudinal screw axis 20 to drive the nut 12 in the driven direction.

As is best shown in FIG. 1, a reduction gear set 50 is connected between the motor 48 and the jackscrew apparatus 10 and includes a pinion gear 52 coaxially fixed to an output shaft of the motor 48 in a position to be driven in engagement with a spur gear 54 coaxially fixed on the screw 16. The reduction gear set 50 is designed and positioned to drive the nut 12 in the driven direction along the screw 16 by rotating the screw 16 in the first direction when driven by the electric motor 48.

As shown in both FIGS. 1 and 2, the biasing member 22 is a helical torsion and compression combination spring designed to exert a backdriving force on the screw 16 sufficient to backdrive the nut 12. The backdriving force is the resultant of a first component vector directed axially opposite the driven direction and a second component vector directed perpendicular to the screw axis 20 in the second rotational direction. The second component vector of the resultant backdriving force exerts rotational or tortional backdriving force on the screw 16 in the second rotational direction to continuously rotate the screw 16 within the nut 12 as the nut 12 travels in the second direction along the screw axis 20.

To reduce frictional resistance to backdriven screw motion, the first component vector of the resultant backdriving force is directed axially to align the resultant spring output force more closely with a lead angle of the jackscrew and therefore with screw motion. To minimize backdrive resistance, the direction of the resultant backdriving force is generally parallel to a lead angle of the helical threads 14, 18 of the nut 12 and the screw 16.

A first end 56 of the biasing member 22 is bent radially inward and is received in a hole 58 formed radially into the second end of the screw 16 opposite the first end of the screw 16 that carries the spur gear 54. A second end 60 of the biasing member 22 is bent axially and is received in a hole 62 formed axially into the nut 12. Because the biasing member 22 is connected between the nut 12 and the screw 16, rather than between the screw 16 and some adjacent structure, the apparatus 10 may be preassembled, i.e., assembled before installation. This precludes the need to install or connect the biasing member 22 after jackscrew installation.

In other embodiments, the biasing member 22 may be other than a spring or may be another suitable type of spring. And, rather than providing enough backdriving force to backdrive the nut 12 on its own, the biasing member 22 may be constructed to provide only enough backdriving force to assist in backdriving the nut 12.

Figure 3:
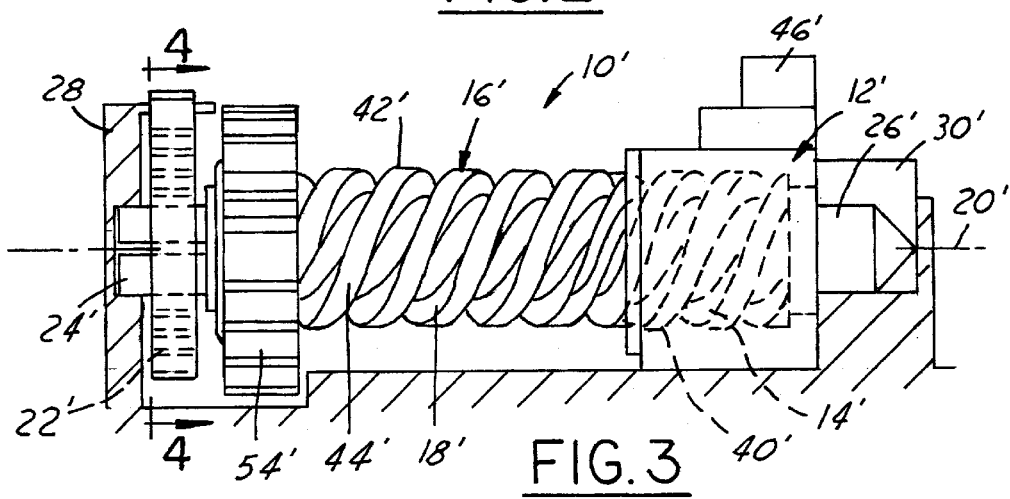
FIG. 3 is a bottom view of a second embodiment of a self-backdriven jackscrew constructed according to the present invention.
Figure 4:
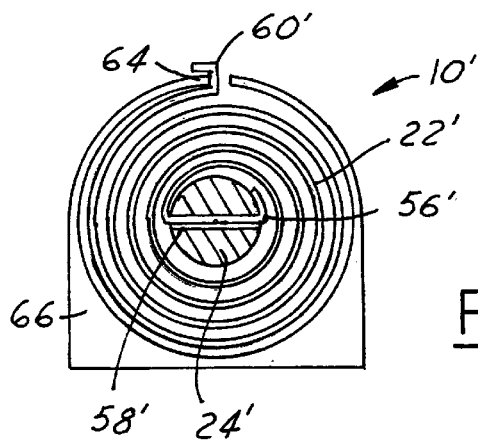
FIG. 4 is a cross-sectional end view of the self-backdriven jackscrew of FIG. 3 taken along line 4—4 of FIG. 3.

As shown in FIGS. 3 and 4, the biasing member 22' of the second embodiment of the self-backdriving jackscrew apparatus 10' provides the same approximate torque on the jackscrew regardless of where the nut 12' is axially positioned along the screw 16'. This is because the biasing member 22' of the second embodiment of the apparatus 10' is a spiral-wound torsion or "clock" spring. As best shown in FIG. 4, an inner end 56' of the biasing member 22' is received in a transverse slot 58' formed diametrically through a second end of the screw 16'. An outer end 60' of the biasing member 22' is hooked over a lip 64 formed in a stationary spring housing 66.

Because of its flat, spiral-wound configuration, the clock spring takes up very little space in the assembly, providing a compact package with the spring housing 66 against the side of the gear 54' on the first end of the jackscrew screw 16'.

In practice, the jackscrew nut 12 is returned to its home position on the jackscrew shaft 44 by connecting one end of the biasing member 22 to the screw 16 so that it applies a backdriving force to rotate the screw 16 in the second rotational direction. The second end of the spring is connected to a structure, such as the nut 12, that is fixed against rotational motion relative to the screw 16. The nut 12 is then moved out of its home position along the screw 16 in the driven direction against the backdriving force of the biasing member 22 by actuating the motor 48 to rotate the screw 16 in the first rotational direction. The nut 12 is then released and the pent-up backdriving force of the biasing member 22 is allowed to move the nut 12 back along the screw 16 opposite the driven direction to its home position on the screw 16 by causing the screw 16 to rotate in the second rotational direction.

This description is intended to illustrate certain embodiments of the invention rather than to limit the invention. Therefore, it uses descriptive rather than limiting words. Obviously, it's possible to modify this invention from what the description teaches. Within the scope of the claims, one may practice the invention other than as described.

We claim:

1. A self-backdriving jackscrew apparatus for returning or reducing resistance to the return of a jackscrew nut to a home position on a jackscrew shaft, the apparatus comprising:
   a nut supported for reciprocal translational motion and against rotational motion and having internal helical threads;
   a screw having external helical threads complementing and threadedly engaging those of the nut, the screw being supported for rotation about a longitudinal screw axis to drive the nut in a driven direction along the longitudinal screw axis when the screw is rotated in a first direction about the screw axis and to backdrive the nut opposite the driven direction when the screw is rotated about the screw axis in a second rotational direction opposite the first rotational direction; and
   a biasing member fixedly connected to the screw at one end and fixedly connected to a structure fixed against rotation at an opposite end, the biasing member being configured to exert backdriving force on the screw that turns the screw in the second rotational direction about the screw axis.

2. A self-backdriving jackscrew apparatus as defined in claim 1 in which the biasing member is configured to exert a backdriving force that includes a force vector component spaced from and directed perpendicular to the screw axis in the second rotational direction.

3. A self-backdriving jackscrew apparatus as defined in claim 2 in which the biasing member is configured to exert rotational backdriving force on the screw in the second rotational direction.

4. A self-backdriving jackscrew apparatus as defined in claim 3 in which the biasing member is configured to provide the same approximate torque on the jackscrew regardless of where the nut is axially positioned along the screw.

5. A self-backdriving jackscrew apparatus as defined in claim 4 in which the biasing member is a torsion spring.

6. A self-backdriving jackscrew apparatus as defined in claim 2 in which the biasing member is configured to exert a resultant backdriving force on the screw having a first component vector directed axially opposite the driven direction and a second component vector directed perpendicular to the screw axis in the second rotational direction.

7. A self-backdriving jackscrew apparatus as defined in claim 6 in which the direction of the resultant backdriving force is generally parallel to a lead angle of the helical threads of the nut and the screw.

8. A self-backdriving jackscrew apparatus as defined in claim 6 in which the biasing member is a helical torsion and compression spring.

9. A self-backdriving jackscrew apparatus as defined in claim 1 in which the apparatus includes a motor drivingly coupled to the screw and configured to rotate the screw in the first direction about the longitudinal screw axis to drive the nut in the driven direction.

10. A self-backdriving jackscrew apparatus as defined in claim 9 in which the apparatus includes a reduction gear set including a pinion gear coaxially fixed to an output shaft of the motor in a position to be driven in engagement with a spur gear coaxially fixed on the screw, the reduction gear set positioned to rotate the screw in the first direction and drive the nut in the driven direction along the screw when driven by the electric motor.

11. A self-backdriving jackscrew apparatus for returning or reducing resistance to the return of a jackscrew nut to a home position on a jackscrew shaft, the apparatus comprising:
    a nut supported for reciprocal translational motion and against rotational motion and having internal helical threads;
    a screw having external helical threads complementing and threadedly engaging those of the nut, the screw being supported for rotation about a longitudinal screw axis to drive the nut in a driven direction along the longitudinal screw axis when the screw is rotated in a first direction about the screw axis and to backdrive the nut opposite the driven direction when the screw is rotated about the screw axis in a second rotational direction opposite the first rotational direction; and
    a biasing member fixedly connected to the screw at one end and fixedly connected to the nut at an opposite end, the biasing member being configured to exert backdriving force on the screw that turns the screw in the second rotational direction about the screw axis.

12. A method for returning a jackscrew nut to a home position on a jackscrew shaft, the method including the steps of:
    providing a jackscrew apparatus including a nut supported on a screw for reciprocal translational motion, the screw being supported for rotation about a longitudinal screw axis;
    fixedly connecting one end of a biasing member to the screw,
    fixedly connecting a second end of the biasing member to a structure fixed against rotation, the biasing member being configured to exert backdriving force on the screw;
    moving the nut along the screw in a driven direction against the backdriving force of the biasing member by rotating the screw in a first rotational direction; and
    allowing the backdriving force of the biasing member to move the nut along the screw opposite the driven direction by causing the screw to rotate in a second rotational direction opposite the first rotational direction.

13. The method of claim 12 in which the steps of fixedly connecting a biasing member include:
    providing a torsion spring biasing member;
    fixedly connecting the one end of the spring to the screw; and
    fixedly connecting the second end of the spring to the structure fixed against rotation.

14. The method of claim 12 in which the step of fixedly connecting a biasing member to the screw includes providing a combination torsion compression spring biasing member.

15. The method of claim 12 in which the step of fixedly connecting a biasing member to the screw includes providing a combination torsion compression spring having an output force vector directed parallel to a lead angle of the jackscrew when the combination spring is installed.

16. The method of claim 12 in which the steps of fixedly connecting a biasing member include: installing a combination spring by fixedly connecting the one end of the spring to the screw and the second end of the spring to the nut.

* * * * *